April 14, 1942.    J. C. ROGERS    2,279,525
ELECTRIC STOVE
Filed Feb. 23, 1940    2 Sheets-Sheet 1

Inventor
John C. Rogers,
By Evans, Pond & Anderson
Attorneys.

April 14, 1942.    J. C. ROGERS    2,279,525
ELECTRIC STOVE
Filed Feb. 23, 1940    2 Sheets-Sheet 2
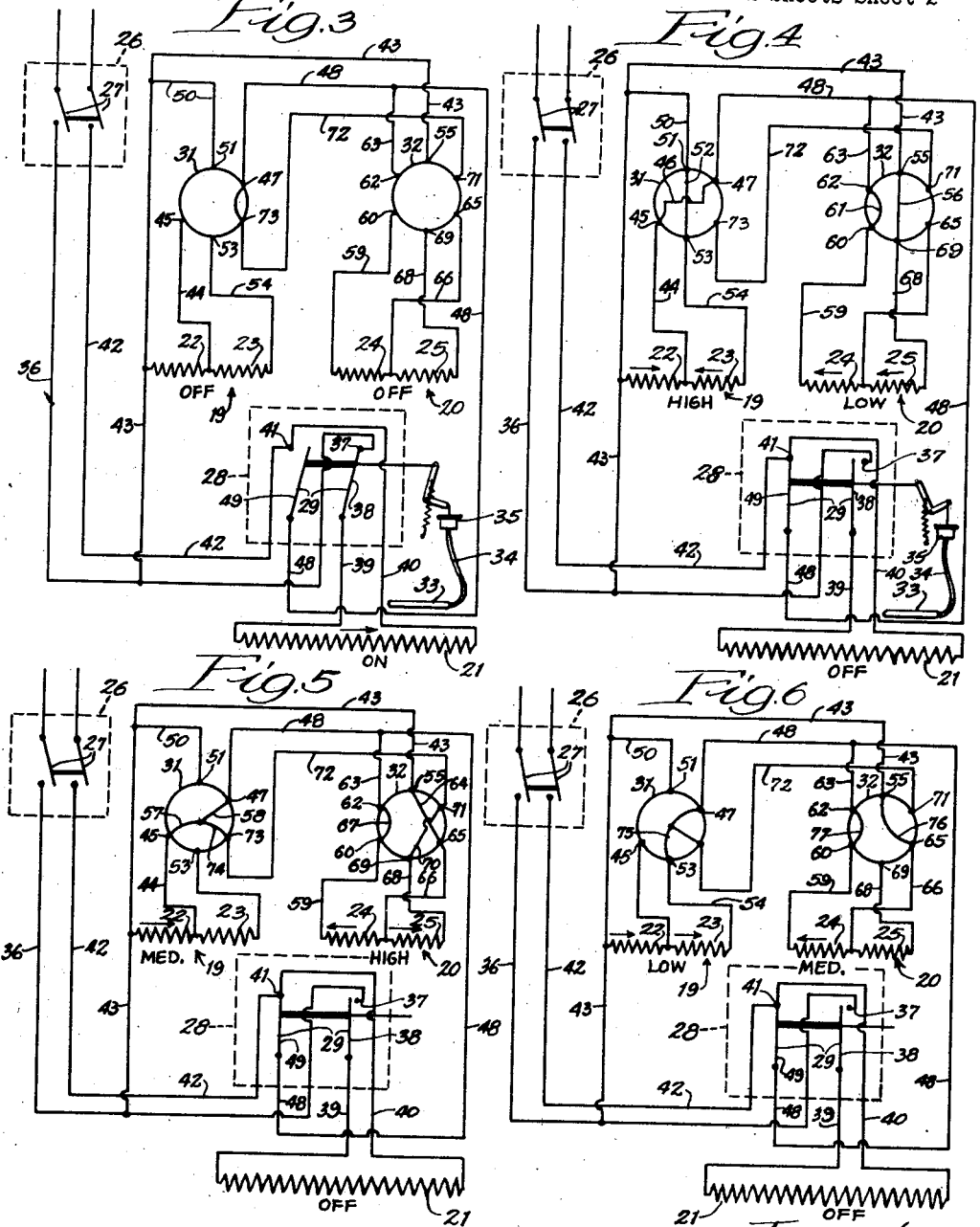

Patented Apr. 14, 1942

2,279,525

UNITED STATES PATENT OFFICE 2,279,525

ELECTRIC STOVE

John C. Rogers, Oak Park, Ill., assignor to Crown Stove Works, Cicero, Ill., a corporation of Illinois Application February 23, 1940, Serial No. 320,259

2 Claims. (Cl. 219—20)

This invention relates to electric stoves or ranges, and more particularly to that type of electric stove having an oven heating element and top heating elements which are connected in circuit with a thermostatic switch which serves to regulate the oven temperature and also to alternate the current between the oven heating element and the top heating elements in such a way that both will not be in service at the same time.

The usual dwelling house is wired for a maximum capacity of about 1650 watts, or 15 amperes, and if a larger wattage is required additional wiring is necessary. With the use of my heat control system I am able to make use of the standard 1650 watt house installation without exceeding the permissive load, and at the same time, in a preferred form of the invention, employ variable heat top burners having aggregate maximum heat capacities exceeding 1650 watts without exceeding such 1650 watt load on the wiring system in case the switches of all the top burners should be simultaneously set at maximum heat. This enables the use of top burners of higher individual heat capacities than has heretofore been possible.

To provide an electric stove heating and heat control system having the above stated capacities and advantages constitutes the main object of this invention.

An illustrative embodiment of the invention is shown in the accompanying drawings, in which—

Figure 1:
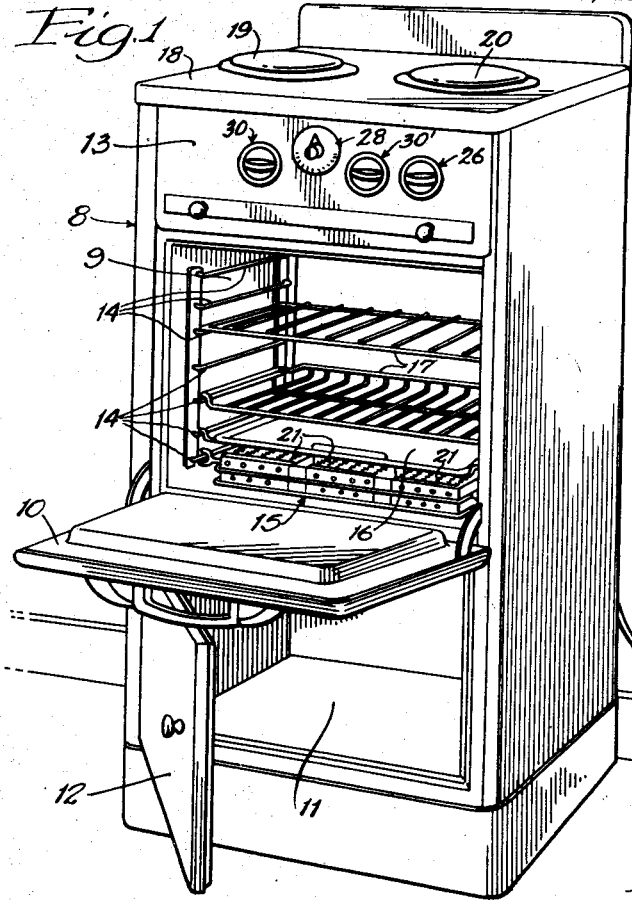
Fig. 1 is a perspective front view of the stove, showing the front doors open.
Figure 7:
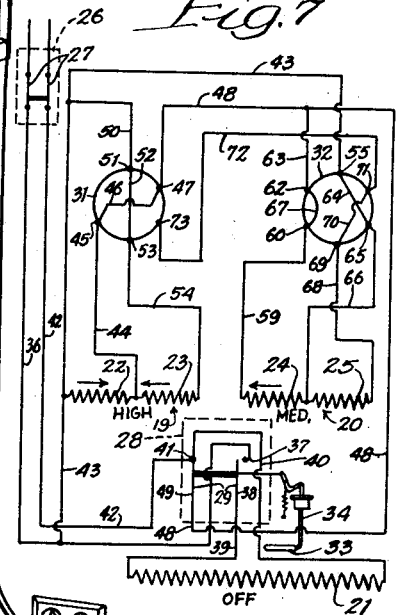

Figs. 3, 4, 5, 6 and 7 are circuit diagrams, showing the oven and top burner heating elements, and the switches controlling the same; Fig. 3 showing the top heater circuits open and the oven heater circuit closed, Figs. 4, 5 and 6 showing the oven heater circuit open, and both of the top heater circuits closed in various selected high, medium and low heat positions, and Fig. 7 showing the oven heater circuit open, and the top heater circuits closed in the high heat positions of both of their switches, and also showing how, in such high heat positions, the maximum permissive wattage is not exceeded.

Referring now to the drawings, the stove, designated as an entirety by 8, comprises an oven 9 equipped with a door 10, an underlying warming chamber 11 equipped with a door 12, and an instrument panel 13. On the sides of the oven 9 are pairs of slideways 14. The lowest pair support the oven heating element designated as an entirety by 15 in the upright position shown for baking; and the pair next above supports the oven heating element in inverted position for broiling, and also a drip pan 16 in the baking position of the heating element 15. The upper slideways may support one or more racks or gratings 17 for the support of pans or other cooking utensils. In the top plate 18 of the stove are mounted two top burners designated as entireties by 19 and 20 respectively. As shown in the diagrammatic views, the active heating element of the oven heater 15 is a resistance wire coil 21 having a heat capacity not exceeding 1650 watts, and preferably 1600 watts. The active heating element of the higher capacity top burner 19 is a resistance wire coil comprising two endwise connected sections 22 and 23, and the active heating element of the lower capacity top burner 20 is a resistance wire coil comprising two endwise connected sections 24 and 25. Each of the top burners 19 and 20 is capable of yielding high, medium and low heats. If the current flows through only one of the coil sections, medium heat is yielded; if it flows through both connected in series, low heat is yielded; and if it flows through both connected in parallel, high heat is yielded. The heat capacities of the two top burners 19 and 20 are such that the aggregate of their high heat capacities exceeds the permissive limit of 1650 watts. In preferred practice the high, medium and low heats of burner 19 impose loads of 1200, 600 and 300 watts respectively on the house wiring system, and the high, medium and low heats of burner 20 impose loads of 800, 400 and 200 watts respectively. Should both of such top burners be simultaneously operated at high heat, it might be expected that, since the two top burner circuits are in parallel, the wattage load would be 1200 plus 800, or 2000 watts—an excess of 350 watts over the permissible maximum. But, as will be hereinafter shown in tracing the circuits on Fig. 7 where the switches of both heaters 19 and 20 have been turned to "high," the switches controlling the burners 19 and 20, and the interconnected circuits in which they are located, operate to send the current only through the "medium" heat section 24 of the resistance wire coil of burner 20, so that the actual total of heat delivered imposes a load of only 1200 plus 400, or 1600 watts.

Figure 2:
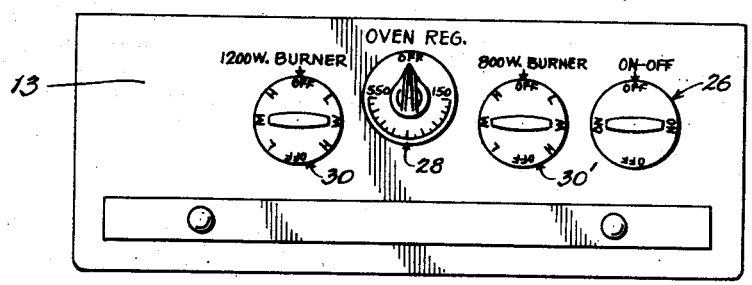
Fig. 2 is an enlarged front view of the front panel which carries the temperature and switch controls.

Describing next the oven regulator and thermostat and manual switch controls, on the front of the panel 13 are mounted four controls, of which that designated as a whole by 26 comprises a knob and cooperating position indicator for an "on and off" two-pole single throw master switch 27 located on the rear side of panel 13 and in the current feed line (Figs. 3 to 7). 28 designates as a whole a knob and oven temperature indicator for a two-pole single throw thermostat-controlled switch 29 mounted on the rear side of panel 13 that normally closes the circuit through coil 21 of the oven heating element 15, but is automatically shifted to open the circuit of the oven heater and close the circuit or circuits of one or both of the top heaters 19 and 20, if their switches are in operating position, when the oven heat has reached either its maximum amount (corresponding to 1600 watts) or a lesser amount corresponding to the setting of the knob on the temperature indicator scale (Fig. 2), at which lesser amount the thermostat also causes the switch to be shifted. The knob of this control normally, and when the stove is cold, stands at the zero or "off" position shown in Fig. 2.

30 designates as a whole a knob and heat degree (high, medium and low) indicator that operates a multiple conductor rotary switch mounted in a support on the rear side of panel 13 graphically indicated by the circle 31 in Figs. 3 to 7 and controlling the heats yielded by the top burner 19; and 30' designates as a whole a similar knob and heat degree indicator that performs the same function for a multiple conductor rotary switch mounted in a support on the rear side of panel 13 graphically indicated by the circle 32 and controlling the heats yielded by the top burner 20.

In the oven 9, and preferably just below the top wall thereof, is located a thermostat bulb 33 and pipe 34 that are filled with a heat expansible fluid that, acting through a diaphragm 35, controls the action of a snap switch-actuator, causing the latter to shift the switch 29 in one direction when a predetermined degree of heat has been reached in the oven, and in the reverse direction when the oven heat has cooled below said predetermined degree. Since such thermostat-controlled switches are old and well known in the art, and no claim thereto per se is made herein, I have not deemed it necessary to illustrate the same fully.

The wiring is such that, regardless of whether the manual switches controlling the top burner circuits are open or closed, the thermostatic switch 29 maintains the oven heater circuit closed and the top burner circuits open, or one or both of the top burner circuits closed if one or both of their switches are in operating position and the oven heater circuit open, so that it is impossible to impose an overload exceeding 1650 watts or 15 amperes on the house wiring system.

Figs. 3 to 7 inclusive show diagrammatically the heating elements, switches and circuits.

Fig. 3 shows the main supply or feed lines connected into the oven heater, with the two rotary switches controlling the top heater circuits open. Assuming that the on-and-off master switch 27 is closed, the current passes by way of feed line 36, contact 37, right hand limb 38 of the thermostat switch 29, wire 39 to one end of the heating coil 21, thence through the latter, wire 40, contact 41 and return feed line 42. No current passes through the top burner circuits.

Fig. 4 shows a setup wherein the thermostatic switch 29 is in its other position, and the circuit through the heating element 21 is broken between the switch limb 38 and the contact 37. The switch controlling the circuit of the top burner 19 has been set at high heat (1200 watts); and the switch controlling the circuit of the top burner 20 has been set to low heat (200 watts). The current flows from the feed line 36, through wire 43, section 22 of the resistance wire coil of burner 19, wire 44, contact 45, switch conductor 46, contact 47, wire 48, lefthand limb 49 of thermostatic switch 29, contact 41 and return feed line 42. The current flowing along wire 43 also flows via branch wire 50, contact 51, switch conductor 52, contact 53, and wire 54 to and through section 23 of the resistance wire coil of burner 19, and thence to return feed line 42 by way of conductors 44, 45, 46, 47, 48, 49 and 41. At the same time current flowing along wire 43 heats the resistance wire coil of burner 20 via contact 55, switch conductor 56, contact 69, wire 68, sections 25 and 24 of the resistance wire coil, connected in series, wire 59, contact 60, switch conductor 61, contact 62, and wire 63 to wire 48, and thence to return feed line 42 through conductors 49 and 41. In this setup, since the resistance sections 22 and 23 are connected in parallel, the top burner 19 is active at high heat (corresponding to 1200 watts) and since the resistance sections 24 and 25 are connected in series the top burner 20 is active at low heat (corresponding to 200 watts); the total load on the house wiring circuit being 1400 watts, which is within the permissive limit.

In the setup illustrated in Fig. 5, the thermostatic switch 29 is in the same position as in Fig. 4, and the switch controlling burner 19 has been turned to medium heat (600 watts) and the switch controlling burner 20 has been turned to high heat (800 watts). In this case the circuit through the oven heater is open, and the circuit through the top heaters is by way of feed line 36, wire 43, section 22 of the resistance coil of burner 19, wire 44, contact 45, switch conductors 57 and 58, contact 47, wire 48, switch limb 49, contact 41 and return feed line 42. At the same time current flowing along wire 43 heats the resistance coil sections 24 and 25 connected in parallel, the route to the resistance coil comprising contact 55, switch conductor 64, contact 65 and wire 66. Thence one route to return feed line 42 is via resistance coil section 24, and conductors 59, 60, 61, 62, 63, 48, 49 and 41; and the other route is via resistance coil section 25, and conductors 68, 69, 70, 71, 72, 73, 74, 58, 47, 48, 49 and 41.

In the setup illustrated in Fig. 6, the thermostatic switch 29 is in the same position as in Figs. 4 and 5, and the switch controlling burner 19 has been turned to low heat (300 watts) and the switch controlling burner 20 has been turned to medium heat (400 watts). In this case the circuit through the oven heater is open, and the circuit through the top heaters is by way of feed line 36, wire 43, sections 22 and 23, connected in series, of the resistance coil of burner 19, wire 54, contact 53, switch conductor 75, contact 47, wire 48, switch limb 49, contact 41, and return feed line 42. At the same time current flowing along wire 43 heats the section 24 of the resistance coil of burner 20, the route comprising contact 55, switch conductor 76, contact 65, wire 66, resistance coil section 24, wire 59, contact 60, switch conductor 77, contact 62, wire 63, wire 48, switch limb 49, contact 41, and return feed line 42.

Figs. 4, 5 and 6 show illustrative combinations of top burner heats obtainable by manipulation of their manually set switches, but the switches are so constructed as to afford numerous other combinations usable when both top burners are in use at the same time. Of course, either top burner may be used alone at high, medium or low heat by simply placing the switch controlling the other burner in off position. However, since the thermostatic switch 29 maintains the main circuit lines connected to either the oven heater circuit or the top burner circuits, but never to both, it is impossible to exceed the maximum load of 1650 watts on the house wiring system by operating the oven and one or both of the top burners at the same time.

It is not intended that in the use of the stove both of the top burners 19 and 20 should be simultaneously operating at high heat; and Fig. 7 shows how, with the wiring and switches employed, if they should both be set to operate at high heat, the maximum permissive wattage of 1650 watts is not exceeded. In this set up, the thermostatic switch 29 is in the same position as in Figs. 4, 5 and 6, and the switch controlling burner 19 has been turned to high heat (1200 watts) and the switch controlling burner 20 has also been turned to high heat (800 watts). In this case also the circuit through the oven heater is open, and the circuit through the top heaters is by way of feed line 36, wire 43, section 22 of the resistance wire coil of burner 19, wire 44, contact 45, switch conductor 46, contact 47, wire 48, left hand limb 49 of the thermostatic switch 29, contact 41, and return-feed line 42. The current also flows through wire 50, contact 51, switch conductor 52, contact 53, wire 54 and resistance coil section 23 to wire 44, and thence, through the route above traced to return feed line 42. The current flowing along line 43 also energizes section 24 of the resistance wire coil of burner 20, passing via contact 55, switch conductor 64, contact 65, wire 66, section 24 of the resistance wire coil, wire 59, contact 60, switch conductor 61, contact 62, wire 63, wire 48, limb 49 of thermostatic switch 29, and contact 41 to return feed line 42. The current cannot return through section 25 of the resistance wire coil because the circuit in which it is included is broken at contact 73. Thus the wattage load imposed by burner 19 when turned to high heat is 1200 watts, but that imposed by burner 20 when turned to high heat at the same time that burner 19 is turned to high heat is only 400 watts, and the aggregate is 1600 watts—a load within the permissive limit of 1650 watts.

I am aware that electric stoves having an oven burner and top burners, and a thermostatic switch by the automatic action of which simultaneous operation of all the burners is prevented and only the oven burner or the top burners can be operated at a time, thus preventing an overload on the house wiring system, are known. But, so far as I am aware, the means for accomplishing this result herein shown, described and claimed are new, and represent an improvement in the art,—especially in the direction of permitting the use of top burners of higher heat capacities than has heretofore been possible.

I claim:

1. In an electric circuit for a stove of the character described, a source of electrical power, two resistance heater units of different wattage capacities located in the top plate of the stove, each of which units includes at least two resistance elements which may be connected to the source of power in series, singly, or in parallel, and control means for said heater units including conductors and a separate, multi-pole, heat control switch having high, medium, and low control positions for each heater unit, said control means serving to connect both of the resistance elements of either heater unit in series with each other and to said source of power when the respective control switch is moved to the low heat position, to connect one only of the resistance elements of either heater unit to said source of power when the respective control switch is moved to the medium heat position, and to connect both of the resistance elements of either heater unit in parallel with each other and to said source of power when the respective control switch is moved to the high heat position, the circuit connection between the source of electrical power and one of the two resistance elements comprising one of said heater units passing through one of the poles of the control switch for the other heater unit and that pole being open when the switch of which it constitutes a part is in the high heat position and being closed at all other times, said control means thereby preventing simultaneous operation of more than one of said heater units at high heat but permitting all other possible operating combinations.

2. In an electrical circuit for a stove of the character described, a source of electrical power, two resistance heater units of substantially differing wattage capacity located in the top plate of the stove, and the sum of their highest heats exceeding the permissible watt load on the wiring system, each of said heater units including two resistance elements which may be connected to the source of power in series, singly, or in parallel, and control means for said heater units including conductors and a separate multi-pole, heat control switch having high, medium, and low control positions for each heater unit, said control means serving to connect both of the resistance elements of either heater unit in series with each other and to said source of power when the respective control switch is moved to the low heat position, to connect one only of the resistance elements of either heater unit to said source of power when the respective control switch is moved to the medium heat position, and to connect both of the resistance elements of either heater unit in parallel with each other and to said source of power when the respective control switch is moved to the high heat position, the circuit connection between the source of electrical power and one of the two resistance elements comprising the higher wattage capacity heater unit passing through one of the poles of the control switch for the lower capacity heater units and that pole being open when said switch is in the high heat position and being closed at all other times, said control means thereby preventing said higher capacity heater unit from being operated at more than medium output when said lower capacity heater unit is operated at maximum capacity but permitting all other possible operating combinations.

JOHN C. ROGERS.